(12) United States Patent
Warn et al.

(10) Patent No.: US 8,280,844 B2
(45) Date of Patent: Oct. 2, 2012

(54) ANOMALOUS ACTIVITY DETECTION

(75) Inventors: Carmen Michael Warn, Manalapan, NJ (US); Sireesh Kumar Nuthi, Plainsboro, NJ (US); Praneeth Chandra Bhattaram, Woodbridge, NJ (US)

(73) Assignee: Bank of America Corporation, Charlotte, NC (US)

( * ) Notice: Subject to any disclaimer, the term of this patent is extended or adjusted under 35 U.S.C. 154(b) by 158 days.

(21) Appl. No.: 12/768,476

(22) Filed: Apr. 27, 2010

(65) Prior Publication Data

US 2011/0202500 A1    Aug. 18, 2011

Related U.S. Application Data

(60) Provisional application No. 61/304,689, filed on Feb. 15, 2010.

(51) Int. Cl.
*G06F 7/00* (2006.01)

(52) U.S. Cl. ........ 707/607; 707/692; 707/736; 707/758; 707/812; 709/201; 709/223; 726/1; 726/4; 726/23

(58) Field of Classification Search ................. 707/607, 707/692, 736, 758, 812; 709/201, 223; 726/1, 726/4, 23
See application file for complete search history.

(56) References Cited

U.S. PATENT DOCUMENTS

| 5,995,983 | A  | * | 11/1999 | Mano ............................ 707/640 |
| 6,381,601 | B1 | * | 4/2002  | Fujiwara et al. .............. 707/692 |
| 6,530,024 | B1 | * | 3/2003  | Proctor ........................... 726/23 |
| 7,698,314 | B2 | * | 4/2010  | Croft et al. .................... 707/607 |
| 7,707,203 | B2 | * | 4/2010  | Hyder et al. .................. 707/710 |
| 7,716,299 | B2 | * | 5/2010  | Lane et al. .................... 707/607 |
| 2005/0256956 | A1 | * | 11/2005 | Littlefield et al. ........... 709/225 |
| 2009/0234826 | A1 | * | 9/2009  | Bidlack ............................. 707/5 |
| 2010/0005048 | A1 | * | 1/2010  | Bodapati et al. ............. 707/101 |
| 2010/0121833 | A1 | * | 5/2010  | Johnston ....................... 707/706 |
| 2010/0125547 | A1 | * | 5/2010  | Barrett et al. ................ 707/607 |
| 2011/0004626 | A1 | * | 1/2011  | Naeymi-Rad et al. ........ 707/776 |
| 2011/0185056 | A1 | * | 7/2011  | McHugh et al. ............. 709/224 |

* cited by examiner

*Primary Examiner* — Shew-Fen Lin
*Assistant Examiner* — Jieying Tang
(74) *Attorney, Agent, or Firm* — Banner & Witcoff, Ltd; Michael A. Springs

(57) ABSTRACT

Methods, computer-readable media, and apparatuses may be configured to detect anomalous activity. Electronic information utilized to detect anomalous activity may be consolidated from multiple data feeds. This electronic information may relate to: extrusion violations, failed logins, sensitive fields access, sensitive objects access, escalation of privileges, or activity during a specific time frame within a time period, and combinations of one or more of these. A de-duplication module may be configured to detect duplicate information or activity events, wherein the duplicate data may be removed and/or consolidated.

18 Claims, 5 Drawing Sheets

ANOMALOUS ACTIVITY DETECTION

This application claims priority from U.S. Provisional Patent Application No. 61/304,689, entitled ANOMALOUS ACTIVITY DETECTION, filed Feb. 15, 2010, and is herein incorporated by reference in its entirety.

BACKGROUND

Increasingly, organizations are responsible for protecting individual's confidential and proprietary electronic information. For example, financial institutions collect and retain vast amounts of personal information in electronic format, therefore the storage and distribution of such information must be closely monitored. This is also true for medical organizations that must effectively collect, store and distribute vast amounts of electronic data while complying with HIPPA (Health Insurance Privacy and Portability Act) and other regulations. Regulating access and distribution of electronic confidential information is more difficult than physical data as it is more readily copied and distributed. Thus, organizations with such information must closely monitor their employees and other individuals to ensure the information is protected, not only from disclosure, but inadvertent contamination.

Prior systems attempted to block certain activities, such as visiting certain sites on the Internet or accessing certain storage devices containing confidential information. Unfortunately, however, blocking sites alone does not provide any indication of a threat. Furthermore, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Additionally, many systems apply a "one size fits all" security policy, which cannot consider the type of user account being monitored.

Current systems don't adequately consider individual characteristics of accounts. For example, certain job responsibilities may require some users to have higher than usual activity levels. Further, an activity by one user may be deemed a threat, while the same action by another user may be the effect of the user fulfilling his/her job responsibilities.

Monitoring multiple data feeds (from one or multiple applications) often leads to multiple reports or data sets. Unfortunately, this may require manual review of duplicate records or data sets. The same may be true of related activities. In this regard, many current systems for collecting and analyzing data from different systems strain valuable resources. Often, the time spent analyzing data exceeds the time available to stop or minimize the threat. Therefore, the lag in data does not present an up-to-date indication of the entity's current threats.

Moreover, current systems do not allow quick analysis of threats that may readily be navigated for more precise information. Often, many systems provide generic solutions that may be deployed across networks among different industries. While having the broad marketability, many systems fail to consider the network the solution is being deployed within. For example, in many networks there will not be common analysis sources for user accounts, network assets are consistently being updated, new assets are being added. Despite these changes, analysts and business personnel alike must quickly determine if any anomalous activity is detected in relation to specific user accounts governed by access rules. Thus, because of one or more shortcomings, current systems may not provide capabilities to readily determine what, if any, action to take. In this regard, may systems provide irrelevant information that could be excluded if prior knowledge and/or analysis were considered. Thus, many systems are providing inefficient, and possibly inaccurate, determinations.

Novel systems and methods that improve upon one or more of these and other deficiencies would be desirable.

BRIEF SUMMARY

Aspects of the embodiments address disclose methods, computer readable media, and apparatuses configured to detect anomalous activity. In this regard, certain embodiments are directed towards consolidating information from multiple data feeds. Exemplary information may relate to: extrusion violations, failed logins, sensitive fields access, sensitive objects access, escalation of privileges, or activity during a specific time frame within a time period, such as after-hours activity, and combinations of one or more of these. In one embodiment, duplicate data (which may be present through no technical or human error) may be removed or consolidated. Further aspects relate to systems and methods that are configured to utilize prior knowledge and/or analysis to allow more efficient analysis in detecting anomalous activity. In certain embodiments, the analysis may also not be more efficient, but also more accurate.

In one embodiment, electronic data regarding activity of multiple individuals may be received. The individuals may be members of an organization, such as a corporation or business entity. In one embodiment, at least a portion of the individuals may be employees of an organization.

In one embodiment, the electronic data may be related to activity during a first time period. The first time period may be relatively short, such as less than 2 days. In one embodiment, the first time period may be about 24 hours. In another embodiment, the first time period may be less than a day. The electronic data may be received from one or more security applications that are configured to monitor activity in relation to network assets.

Certain embodiments may remove duplicate entries and/or consolidate similar entries. Certain embodiments may only comprise either de-duplication or consolidation capabilities. Yet in other embodiments, both capabilities may be implemented. In this regard, novel systems and methods are disclosed for the detection and removal of duplicate entries. In certain embodiments, one or more received duplicate entries are not a result of technical or human error. Consolidation of similar entries may further reduce both network resources and time spent by analysts to determine whether to escalate an event. In certain embodiments, the implementation of certain processes disclosed herein, duplicate entries are reduced by at least 50%. In another embodiment, duplicate entries are reduced at least 80%. In yet further embodiments, duplicate entries are reduced more than about 98%.

Aspects of the invention further relate to enriching at least a portion of the electronic data. Moreover, one or more policy and business rules may be configurable to monitoring requirements. In this regard, a knowledge database may be updated to further increase the value of the collected information. Therefore, a knowledge database may include information, observations and analysis previously gained by analysts and/or computer-implemented processes. A knowledge database may be cross-referenced with output from one or more other applications, such as one or more disparate security applications. Embodiments disclosed herein may allow for the removal of non-anomalous activity from consideration, and thereby permit a more focused and direct monitoring of network assets, such as protected databases.

Further aspects relate to systems and methods for displaying the detected activity and/or whether certain activity has been determined to be marked as in need of being escalated. In one embodiment, a summary of the detected activity may be transmitted through a network and displayed as part of a graphical user interface (GUI). Further embodiments relate to receiving a user input selecting a graphical representation of certain activities or criteria. In one embodiment, a graphical display of enriched data may be provided. In further embodiments, an analyst may provide a user input to select the raw data collected from one or more security applications.

Aspects of the embodiments may be provided in a computer-readable medium having computer-executable instructions to perform one or more of the process steps described herein. These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed that assist the detection of anomalous activity. One aspect relates to the detection of duplicate data within multiple data feeds. The duplicative data may be properly provided within the data feeds through no technical or human error. Further aspects relate to novel collections of data, such as a knowledge database comprising prior knowledge and/or analysis. Such collections may provide information regarding user accounts governed by one or more access rules. The user accounts may be related to an organization, such as employees of an organization. Further aspects relate to systems and methods configured to enrich data. In one embodiment, data regarding potentially anomalous activity is first de-duplicated and/or consolidated and then cross-referenced against a collection of prior knowledge and/or analysis.

Figure 1:
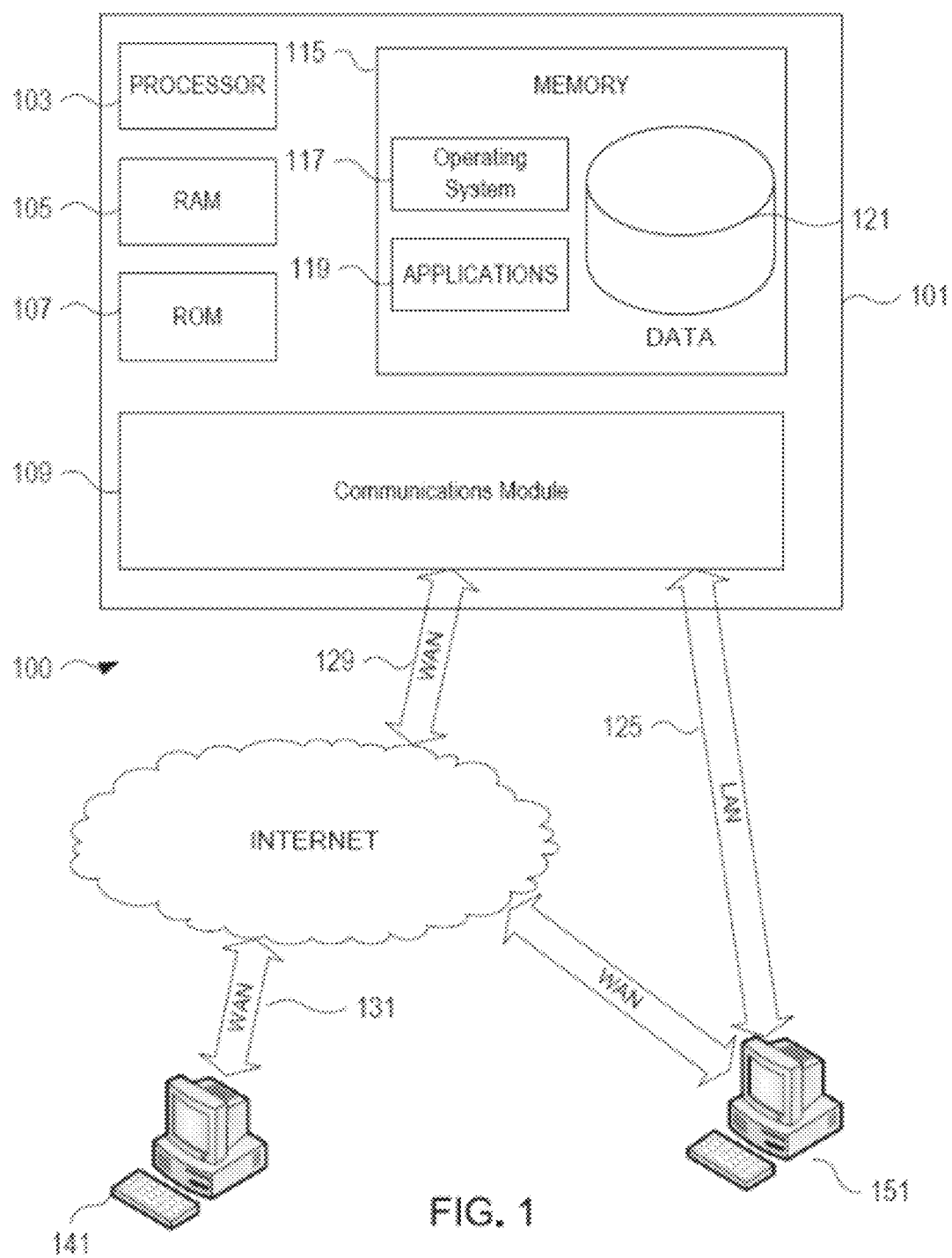
FIG. 1 shows an illustrative operating environment in which various aspects of the embodiments may be implemented.
Figure 2:
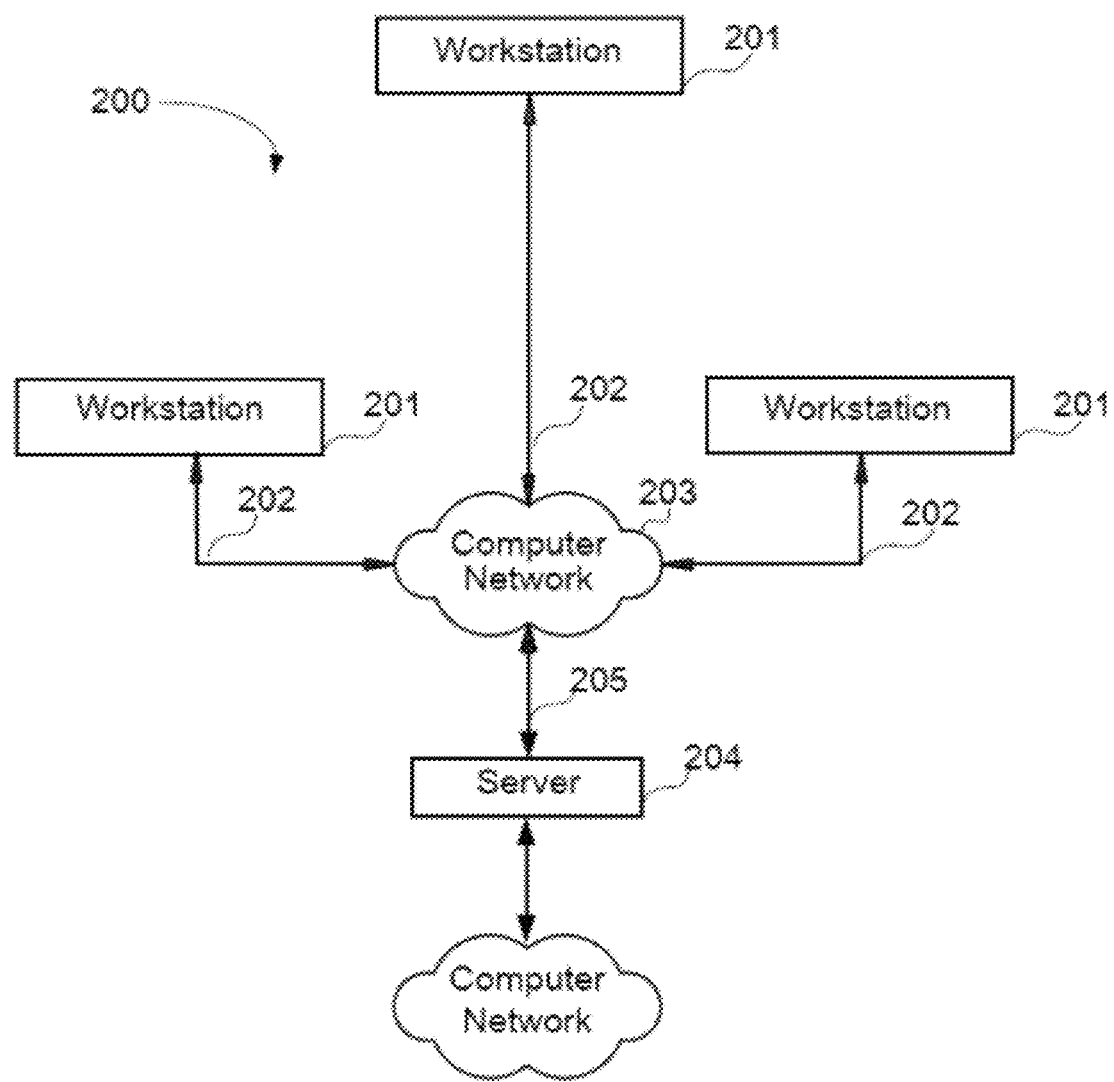
FIG. 2 is an illustrative block diagram of workstations and servers that may be used to implement the processes and functions of certain aspects of the embodiments.
Figure 3:
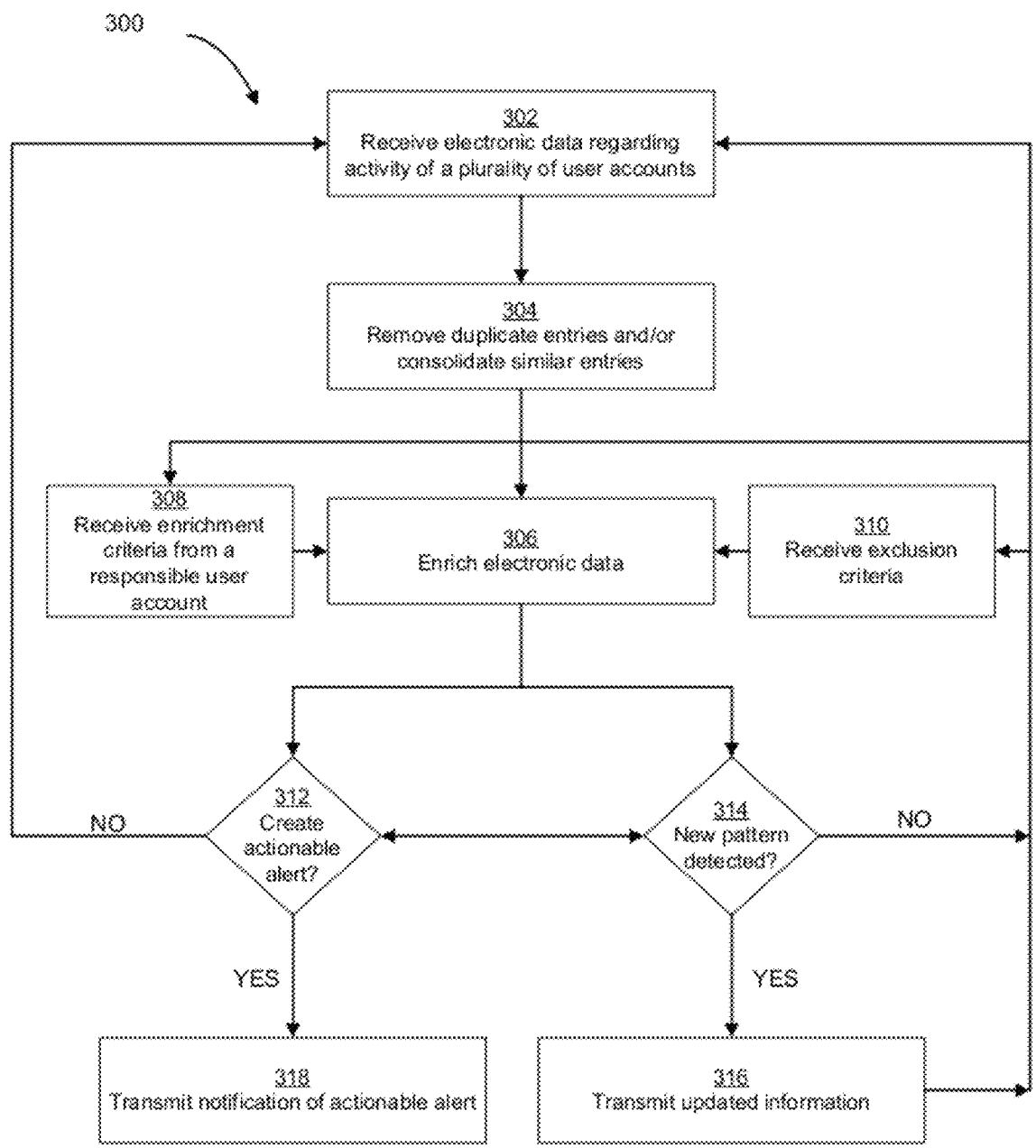
FIG. 3 shows a flow diagram of an illustrative method in accordance with one embodiment.

FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, databases, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 125 through a network interface or adapter in the communications module 109. When used in a WAN networking environment, the server 101 may include a modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links. Connectivity may also be supported to a CCTV or image/iris capturing device.

With some embodiments, illustrative system 200 may support an interactive system as will be further discussed. For example, workstations 201 may function as user terminals and server 204 may function as a security application control system that monitors activities of multiple user accounts on workstations 201. As understood by those skilled in the art, the steps that follow in the FIGS may be implemented by one or more of the components in FIGS. 1 and 2 and/or other components, including other computing devices.

Aspects are directed towards the monitoring, detection, and/or collection of data in regards to potential threats to an organization (or domain). Certain aspects relate to determining what data represents potentially anomalous activities. FIG. 3 shows an exemplary flowchart 300 that may be used to detect anomalous activity in relation to one or more "user accounts" transmitting data transmitted through over a network. In one embodiment, one or more of the "user account" may be associated with a particular individual, such as an employee of an organization. Thus, regardless of whether the individual is using user terminal 141, user terminal 151, or any workstation 201, the individual's actions may be tied to a particular user account. In an alternative embodiment, a "user account" may be associated with a particular computing device. Thus, in one embodiment, if any of a plurality of individuals use a particular computing device, such as user terminal 141, the computing device will be a specific user account. In another embodiment, a "user account" may be a combination of specific user(s) on specific computing device(s).

As would be understood by those skilled in the art, it is quite common for a subset of user accounts within an organization or domain to have access to resources not available to other user accounts within the same organization or domain. Unlike certain prior art systems, embodiments disclosed herein may be used to across an organization or domain having user accounts with security features that differ from other user accounts. For example, in one embodiment, each user account may have access to a first network, such as the "Internet" through WAN 131 shown in FIG. 1, however, only a subset of those accounts may have access to a second network, such as specific resources accessible on the organization's or domain's intranet, such as through LAN 125. In one embodiment, the resources may include a centralized store of electronic data that is accessible from several different user terminals 141/151 or workstations 201. Embodiments discussing this will be discussed in more detail below.

In one embodiment, block 302 may be implemented to receive electronic data regarding activity concerning a plurality of network assets. In one embodiment, at least one of the network assets is a protected database configured to be accessed by certain user accounts governed by one or more permissions or access rules. In one embodiment, the electronic data comprises information regarding activity of a plurality of user accounts. Exemplary network assets may include one or more servers, electronic devices, computer-readable mediums, files, portions of files, tables, and combinations thereof. In this regard, an entire server may be considered an asset while a specific file located on that server (or another server) may be classified as a second asset.

Indeed, any transmission of data (such as for example, the transmission of packets) from one device to another constitutes activity that may be detected within the scope of this disclosure. In this regard, information regarding, relating, or information within a network packet or collection of information packets would be within the scope of this disclosure. The data may be transmitted and/or received on an ongoing basis. Yet, in other embodiments, at least a portion of the data is first collected on a computer-readable medium(s) and then transmitted to a second computer-readable medium(s) after a predetermined collection period. In one embodiment, the electronic data may be received on about a daily basis. The received data may comprise information collected during a first time period, such as the preceding day or 24 hour period.

Those skilled in the art with the benefit of this disclosure will readily appreciate that the content of the data (as well as the format the data is received in) could depend on a myriad of factors, including but not limited to: the size and quantity of the network assets, quantity of user accounts, desired or intended protection, business concerns, and combinations thereof. Exemplary electronic data may comprise information relating to: extrusion violations, failed logins, sensitive fields access, sensitive objects access, escalation of privileges, or activity during a specific time frame within a time period, such as after-hours activity and/or combinations having one or more of these.

In this regard, electronic information relating to user account activity may be received. The electronic information may comprise multiple data feeds. In one embodiment, exemplary data feeds may include: extrusion violations, failed logins, sensitive fields access, sensitive objects access, escalation of privileges, or activity during a specific time frame within a time period, such as after-hours activity, and combinations having of one or more of these. User accounts may be governed by access rules or permissions, such that one user account is configured to access at least one network asset (such as for example, a database) that at least one other user account is not configured to access. The electronic information may comprise information regarding activity during a first time period, such as over a 24 hour time period. In other embodiments, the time period may be about 24-48 hours. The amount of time, however, may be anywhere from 1 hour to 1 week in certain embodiments. Monitoring or detecting activity over a relatively short time period allows IT or security personnel to act quickly to prevent or minimize any adverse events. In certain embodiments, collecting data regarding activity over about a 24 hour time period ensures adequate collection of data.

The values received for each data feed may be compared with values from data feeds during a second time period. In the illustrated embodiment, block 302 may be implemented to receive an indication of values for one or more activities associated with a user account. In one embodiment, one or more computer-executable instructions measure at least a portion of the activities on computing devices, such as user terminals 141/151 and/or workstation 201. The computer-executable instructions may be read by processor 103 on device 101 shown in FIG. 1.

Exemplary activities are described below, however, those skilled in the art with the benefit of this disclosure will readily understand that additional or fewer activities may be measured without departing from the scope of the invention. Further, while the exemplary activities are described in relation to block 302, those skilled in the art will understand that such actions may be conducted in relation to one or more additional processes.

Figure 4:
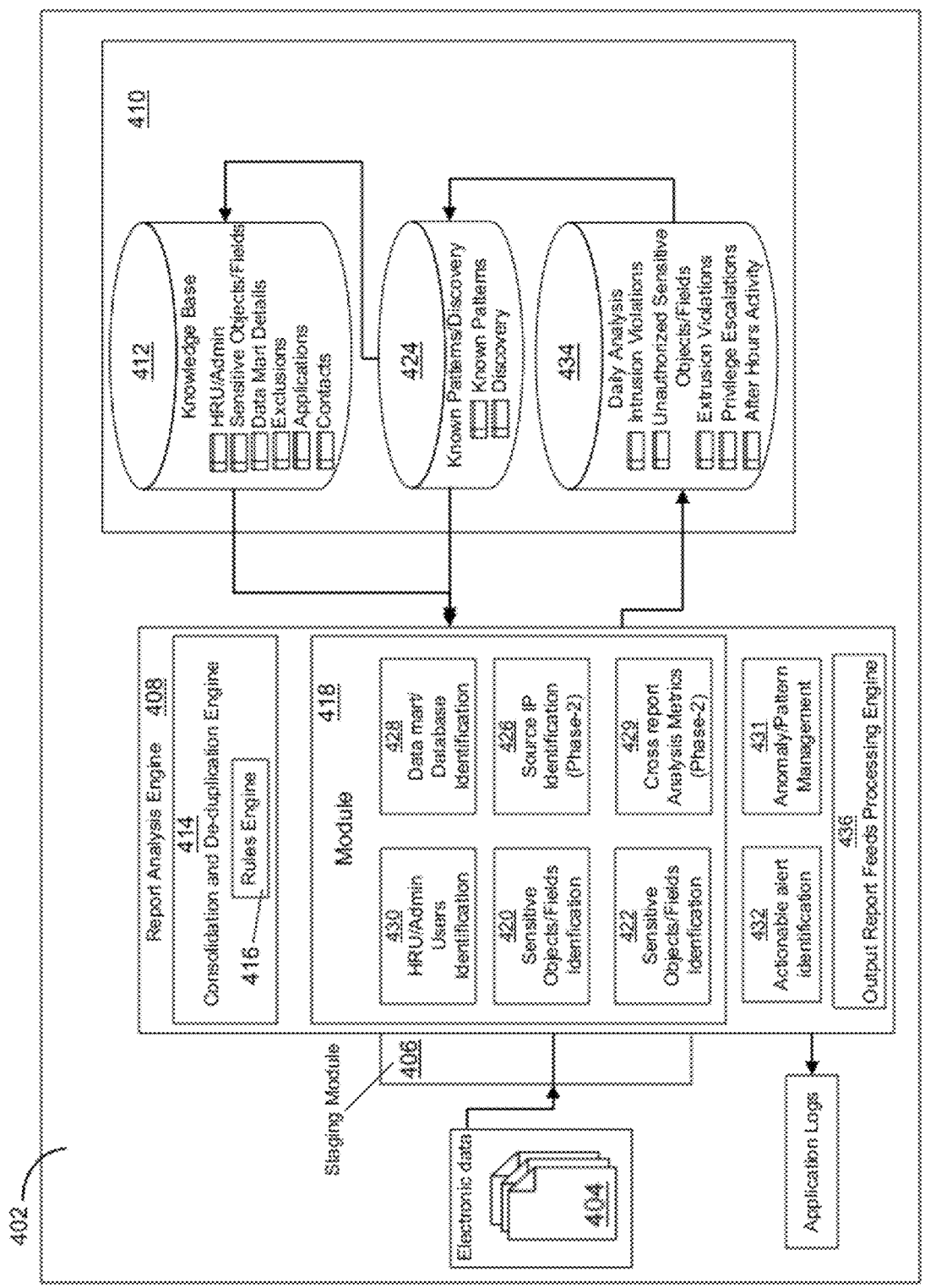
FIG. 4 show an illustrative apparatus in accordance with certain aspects of the embodiments may be implemented.

In one embodiment, at least a portion of the data may be received at staging apparatus 402 shown in FIG. 4. While the term "apparatus" may be used throughout this disclosure, those skilled in the art with the benefit of this disclosure will readily appreciate that any electronic device having a computer-readable medium and a processor, such as any one or more illustrative devices shown in FIG. 1 and/or FIG. 2 to execute computer-readable instructions on a medium is within the scope of this invention. Further, while one or more apparatuses may be shown to carry out exemplary processes, those skilled in the art will understand that one electronic device may be used rather than several separate and distinct devices. Likewise, the use of exemplary "modules" within the apparatus or electronic devices is provided to more clearly illustrate examples of possible implementations. In this regard, one or more modules may comprise the same processor or computer-readable medium(s).

Electronic data 404 may be received though any communications channel. In the illustrative embodiment, staging module 406 may be configured to receive electronic data 404 generated by one or more applications, for example security applications. In one embodiment, a plurality of individual reports may be generated from a single source (i.e., a single deployed security application). In one embodiment, electronic data 404 comprises comma separated values. For example, in certain implementations, at least a portion of the data is transmitted as a comma separated value (CSV) file. In another embodiment, at least a portion of the data may be converted to a different electronic format before or after being transmitted to staging apparatus 402. Electronic data 404 may be transmitted to the staging module 406 on a routine basis, such as, for example, at about a daily basis. In other embodiments, the staging module 406 may be configured to receive data on an irregular basis, such as for example, when certain data is generated.

In certain embodiments, staging apparatus 402 may include report analysis engine 408 configured to process the data received at staging module 406 and/or another storage medium. For example, report analysis engine 408 may implement one or more processes for converting specific events into escalations and/or notifications. In one embodiment, the report analysis engine 408 may be in operative communication with a collection of known information. Illustrative known information may include: data classification for particular types of sensitive data (i.e., non-public information); information regarding the identity of user accounts; information regarding sensitive objects or fields within objects; and/or past data (which may be raw or analyzed) regarding known behavior.

In certain embodiments, known behavior may be identified as acceptable or unacceptable. Thus, whether a behavior or activity is considered acceptable may be utilized to determine if anomalous activity has or is occurring. In the illustrative embodiment, at least a portion of the information may be stored at repository 410, such as at knowledge database 412 (discussed in more detail below, including paragraphs 62 and 67-71). Through the use of one or more rules engines, the report analysis engine 408 may be configured to process known anomalies or patterns detected in electronic data 404 and information referenced within repository 410. The processing of known anomalies and/or patterns may provide an output of one or more actionable elements. It may further be configured to transmit updated information to the repository 410.

In accordance with various aspects of certain embodiments, electronic data referring to the same activity and/or related activity may be detected. As one example, block 304 of FIG. 3 may be implemented in accordance with various embodiments to remove duplicate entries and/or consolidate similar entries. Certain embodiments may only comprise either de-duplication or consolidation capabilities. Yet in other embodiments, both capabilities may be implemented. In certain embodiments, one or more duplicative data may not be the result of human and/or technical error, but rather may be the result of receiving data from multiple data feeds. Exemplary processes will be explained in relation to an illustrative consolidation/de-duplication engine 414, which may be located with other engines or modules within staging apparatus 402 or another electronic device. While shown together, those skilled in the art will appreciate that one or more modules may execute on or more processes relating to the consolidation and/or the de-duplication of data. In one embodiment, a de-duplication engine may remove report entries that refer to the same event. In one embodiment, elimination of duplicates may be based on one or more configuration parameters. The elimination and/or consolidation of similar entries may reduce both network resources and time spent by analysts to determine whether to escalate an event. In certain embodiments, the implementation of certain processes disclosed herein, duplicate entries are reduced by at least 50%. In another embodiment, duplicate entries are reduced at least 80%. In yet further embodiments, duplicate entries are reduced more than about 98%. Thus, according to certain embodiments, a more efficient method for detecting anomalous activity may be implemented. Exemplary components may include one or more of the following:

Key: In one embodiment, one or more values at positions in an input file may be used to detect (and possibly eliminate) duplicates. For example, if information (such as received from electronic data 404 at block 302) indicates that activity from the User U1 occurred through Client IP C1 and communicated with Server IP S1, this user activity may show up on several different and disparate reports or data points (which may be from multiple incompatible applications and/or require manual review of the same activity across different reports or data points). For example, the same activity may be revealed on data reporting the User, the Client IP, Server IP or other identifying information regarding a possibly unauthorized or illegal event. Thus, information across several different reports or notifications may refer to the same event (which may not be the result of human and/or technical error).

Non Key: In one embodiment, the time of the individual data points may be correlated to identify duplicates. For example, in an embodiment using a CSV file, one or more values at positions in the input file may be updated with the most recent value when doing the de duplication, such as a time stamp.

Sum: In certain embodiments, similar or identical activity may be summed together. For example, in an embodiment using a CSV file, it may be determined which values at position in the input file should be summed up to show the aggregated counts. For example, the quantity of the non-public information consumed, transmitted, and/or received by the activity may be summed. This or similar processes may also be advantageous to consolidate related events. For example, if a specific action (such as any action identified within paragraphs 43-44) was repeated over a different time period (or maybe from different computers), certain implementations may consolidate those records and sum the quantity of occurrences.

Append: In certain embodiments, one or more values (for example of a CSV file) at position in the input file may be flattened by comma separation. These fields, which for example, may refer to the source program, will be consolidated.

In one embodiment, the quantity of data "consumed" (such as transmitted and/or received) per activity or groups of activity may be determined. For example, if it is determined that a data extrusion occurred, the total amount of data transmitted (for example through a plurality of packets) may be quantified.

Block 306 may be implemented to enrich at least a portion of the electronic data 404 or derivatives thereof, such as resultant data derived from consolidation and/or de-duplication processes, such as through block 304. In one embodiment, staging apparatus 402 or another electronic device may include an event enrichment module 418. Event enrichment module 418 may include one or more additional modules or engines for enriching any events detected in the data using criteria (hereinafter "enrichment criteria"). For example, as shown in FIG. 4 event enrichment module 418 may implement enrichment criteria using for example, a sensitive objects/fields identification module 420. In certain embodiments, the sensitive objects/fields identification module 420 may provide specific information regarding objects and/or fields within certain objects. In further embodiments, it may aid in the discovery of new fields/objects (which may be updated in knowledge database 412 or another accessible computer-readable medium, while newly discovered fields/objects may be placed in Discovery tables.

In one embodiment, different groups of user accounts may have different thresholds for what is classified as a sensitive object and/or field. In this regard, block 308 may be permitted to allow a division or group may to update threshold values. Thus, if a group of user accounts is undertaking a new assignment in which access (or a level of access) to a sensitive object is required; it may be updated and applied for new data. As will be understood by those skilled in the art with the benefit of this disclosure, almost any parameter may be adjusted to a specific threshold, including the time of day, quantity of accesses, time elapsed, whether a user account may modify an object or field, and combinations thereof. Thus, previously collected information, whether received from a request to update threshold values and/or past activity, may allow better determination of what activities from different users may be of concern.

Figure 5:
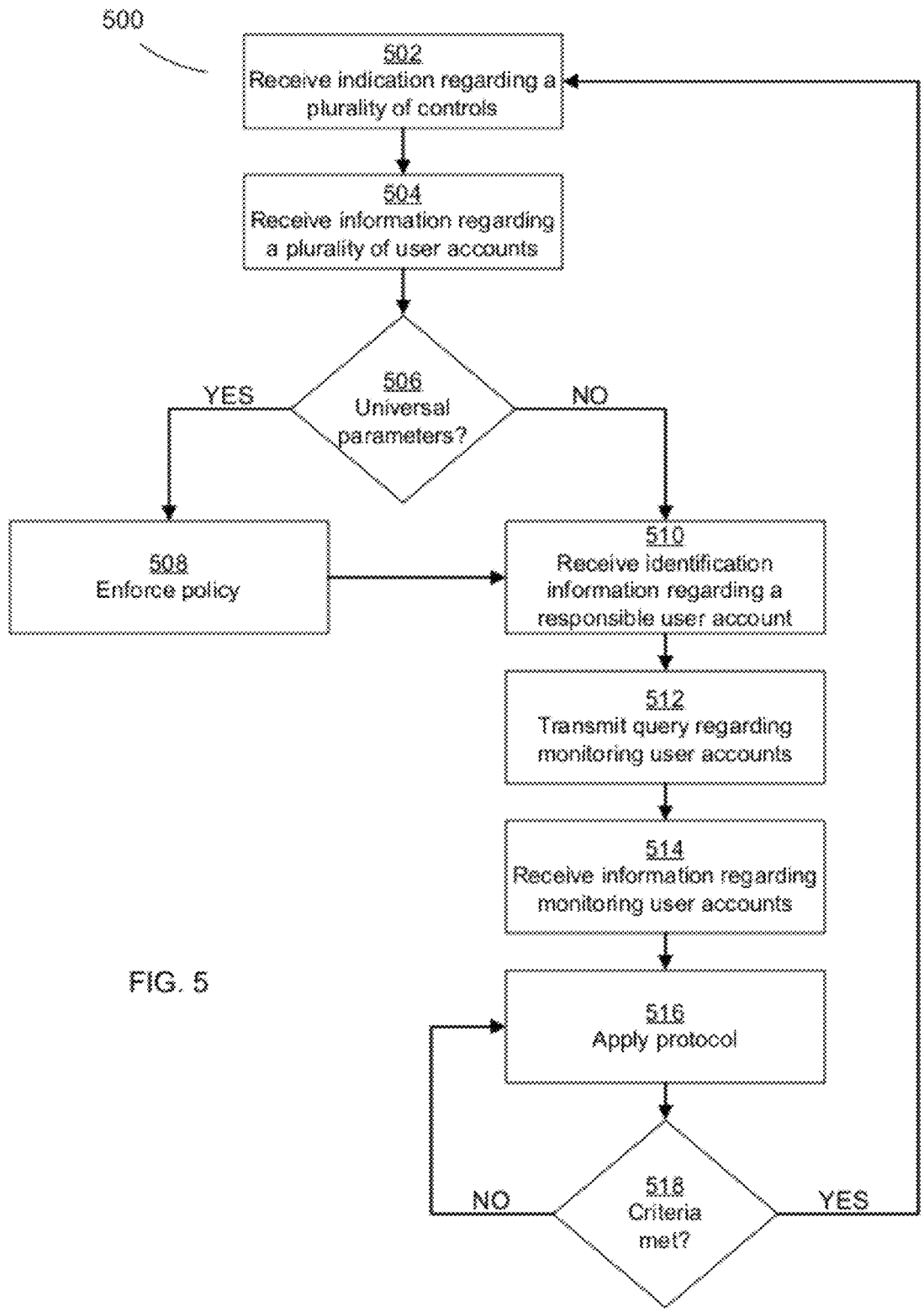
FIG. 5 shows a flow diagram of an illustrative method in accordance with one embodiment.

In this regard, certain aspects of the invention relate to monitoring different groups of user accounts with respect to different controls and different thresholds for one or more of the different controls. FIG. 5 provides an illustrative flowchart 500 of one exemplary method in accordance with one embodiment. Block 502 may be implemented to receive an indication regarding a plurality of controls. For example, in one embodiment, the controls are determined based upon detecting or receiving information regarding the capabilities of a security application. The reception of at least a portion of the information may be received automatically from a deployed security application and/or computer-executable instructions on a computer-readable medium that extract information regarding the capabilities or outputs of a security application. For example, in one embodiment, a report or electronic data, such as for example, electronic data 404 received at staging apparatus 402, may be analyzed to determine what controls an application or several applications may be configured to monitor. In another embodiment, data may be obtained from known patterns or recent discovery events. In one embodiment, such known patterns/discovery data may be stored on computer-readable medium 424.

Block 504 may be utilized to receive information regarding a plurality of user accounts. Such information from the user accounts may be formatted according to one or more methods known to those skilled in the art or using one or more novel methods or components described herein. Further, based upon this information, and as part of block 504 or any other process, several user accounts may be grouped together. Grouping may be determined by any number of criteria, including but not limited to: the user's predetermined security level, job responsibilities, division or organizational structures, supervisor information, or any criteria.

Block 506 may be implemented to determine if a universal parameter or combination of parameters are not permitted to be altered for a group of user accounts. For example, in one embodiment, the grouping of user accounts may be performed according to individual subsidiaries of a large corporation. In that embodiment, the corporation that owns the subsidiaries may indicate which actions or activities are not permitted by any user account within one or more subsidiaries. Other embodiments may group employees according to job responsibilities or any other classification scheme. Thus, in one embodiment, such controls and/or a combination of activities spanning multiple controls may be removed from further consideration to ensure such policies are enforced (see block 508). In one embodiment, a universal parameter may be enforced, such as monitoring for a specific activity, despite a request (such as described below) to not receive reports regarding those activities.

Block 510 may be implemented to receive identification information regarding a user account that is responsible for a plurality of user accounts. For example, the user account may be associated with a supervisor of employees (each of which may have a user account that was implicated as part of block 504). In one embodiment, such information may be received from knowledge database 412. Such information may be automatically updated. In one embodiment, at least a portion of the information may be stored at sensitive objects/fields identification engine 420. Further discussions relating to the sensitive objects/fields identification engine 420 and possible uses of the engine are discussed below, for example, in relation to block 312 of FIG. 3.

In certain embodiments, a query may be transmitted to the user account responsible for a group of user accounts (see, e.g., block 512) requesting information to be detected, monitored, and/or reported. In one embodiment, block 512 may be omitted and information may be received without the requirement for a query to first be transmitted (see block 514). Exemplary information that may be received (for example, at block 514) may relate to, but is not limited to: sensitive objects/fields, associates with privileged access and/or any other type of access information. Such information may be received to indicate which activity to monitor and/or filtering. At least a portion of the information received at block 516 may directly affect subsequent alert collection. Yet in other embodiments, at least a portion of the information may affect the reporting of certain activities. Rules applying the information received at block 514, 506, 504, and/or 502 (and further inputs) may be implemented (see block 516). In one embodiment, thresholds for different controls (such as the consumption of non-public information) may be maintained. In this regard, alerts may be flagged with these thresholds for highlighting the violations. Further description of implementing different embodiments will be disclosed later in this disclosure.

In certain embodiments, block 518 may be implemented to determine whether a condition is met. The condition may be, for example, lapsing of a predetermined time frame, new laws or regulations (either internal or external to the organization) may need to be accounted for, a change in the number or user accounts within a group, a new group formation, or any criteria. If no criteria are met, block 516 may continue to be implemented. If, however, one or more criteria are met, one or more actions may be implemented. For example, any of the preceding steps may be implemented.

Returning to the embodiment illustrated by the flowchart of FIG. 3, block 310 may identify electronic data that should be excluded from specific analysis. In one embodiment, data determined to be excluded at block 312 may be excluded from further analysis. The determination to exclude data may be performed before, during, as a part of, and/or after the determination of sensitive objects and/or fields (such as with module 420). Looking to the illustrative embodiment of FIG. 4, event enrichment module 418 or any electronic device may comprise an exclusion objects identification module 422.

In one embodiment, the exclusion objects identification module 422 may be configured to identify one or more known parameters that are to be excluded from further analysis and/or viewing (for example by security or IT personnel). The exclusion of certain parameters may be advantageous in several different scenarios. First, some received data may not be relevant. For example, data received from prior knowledge (which may be stored in known patterns/discovery 424) or another computer-readable medium may indicate that certain activity is either authorized or permitted. Similarly, past experience may indicate that such activity does not meet a threshold level of risk. For example, if an activity is authorized during time T1 to T2 of a given day from the User U1 with Client IP C1 and Server IP S1, data relating to such event(s) may be suppressed in further analysis. Second, even if approved, there may be certain activity that an organization would not want revealed to any analysts. In certain embodiments, data related to suppressed activity may not be initially utilized in any further analysis; however, it may be stored and later accessed. In this regard, the suppressed data may be utilized in analysis at a later time. Thus, the exclusion of certain information combined with access to prior knowledge and/or analysis provides the benefit of a more efficient analysis. Further, the detection may be more accurate by excluding potentially misleading and/or irrelevant information.

A source IP identification module 426 may be implemented in certain embodiments in which data within a report (i.e., a data feed) contains an electronic address identifier. For example, one electronic address commonly is an IP (Internet Protocol) address. Yet any identification that may identify a particular network asset, including a MAC address, among others, may be used within the scope of this disclosure. In these embodiments, the electronic address identifier may be processed to reveal additional information regarding a particular user associated with a user account. The electronic address identifier may be cross-referenced with information within the knowledge database 412. In certain embodiments, this process may be performed upon first receiving a new electronic address identifier. Yet in other embodiments, at least a portion of the process may be initiated upon each instance of receiving an indication of the electronic address identifier. This process may be useful, for example, to ensure the most recent and accurate information is received. In certain embodiments, the source IP data module may be part of, or used in conjunction with the datamart identification module 428. Datamart identification module 428 or an equivalent may be utilized to identify the specific data regarding an accessed database and/or information relating to the accessed database and/or the user account accessing the database. For example, a security application may indicate that User 1 attempted to retrieve sensitive data from DB1. Thus, in certain embodiments, datamart identification module 428 may retrieve information indicating that DB1 is known within an organization as a specific name. For example, networking components are generally assigned a unique MAC address, storage devices may be assigned a volume identifier, and/or once these devices or other peripherals are placed within a network, such identifiers may be used by security applications and/or other applications to refer to them. Unfortunately, however, indicating that address 192.168.6.330 or storage volume CRG08330 in an output may not be useful. In this regard, using a common name (which, for example, may comprise an alphanumeric representation) that is recognizable by one or more users within one or more divisions of an entity may be more useful. Thus, in a accordance with various embodiments, "common name" may be used in relation to a database (or a portion thereof), a user associated with a user account, a of a network asset, and combinations of one or more of these.

The module 420 may also retrieve information regarding what group(s), subdivision, and/or organization, that the database (or apparatus housing the database) belongs to. In further embodiments, it may also provide the contact information for a group member of that database. Further information may provide identification of User 1, including their name, position, access rights, supervisors (including contact information) and combinations thereof. At least a portion of this information may be stored in repository 410, including the knowledge database 412.

In certain embodiments, identification module 430 may be used to identify information relating to the user accounts implicated in one or more detected activities. In one embodiment, the identification module 430 may receive input from knowledge database 412. Information from the identification module 430 may be used to identify status of the user of the user account from an event implicated in the data. Users can be admin users or users who have access to sensitive databases or tables within databases. For example, while in certain embodiments, the determination of sensitive objects and/or fields (such as with module 420) may determine if a user account has permission to access a certain resource/asset, further information may be received to determine what action the user account attempted with the resource/asset. For example, whether the user attempted to execute an administrative command, overwrite a file, delete a field, and combinations thereof. Further embodiments may compare user account actions with actions during a previous time period. In one embodiment, cross report analysis metrics module 429 may be utilized. For example, it may be utilized to identify user activities across different data sets or reports and assist in enriching the event with the findings.

A determination may be made as to whether an alert (or information regarding an alert) for an activity may be considered actionable (block 312). At least a portion of the determination may be made based upon one or more outputs from one or more of the engines, modules, or any process described herein. In one embodiment, an anomaly/pattern management engine 431 may be utilized. Anomaly/pattern management engine 431 may be operatively connected and/or part of any other engine. Furthermore, it may be operatively connected to computer-readable medium within repository, such as computer-readable medium 424, which may contain data regarding known patterns, including, for example, alerts along with their feedbacks and actions taken. Maintaining this repository helps analysts to know how many times a particular pattern have been repeated and what action(s) were taken for the given alert. Using different flags, analysts can decide on whether to continue or ignore actions. Again, having access to prior knowledge and/or analysis may allow for more efficient determinations that conserve network, capital and human resources.

In certain embodiments, block 314 may be implemented to determine if new patterns are discovered. A computer-readable medium, which may in one embodiment be computer-readable medium 434 may comprise recently received (e.g. daily) data stored in various tables. With the current data, separate tables may be maintained for each report. As further shown in FIG. 4, computer-readable medium 434 may be connected to medium 424. In one embodiment, the results or analyzed information may be transmitted to an actionable identification module 432. In one embodiment, rules on a computer-readable medium may be executed to compare the data regarding incoming alerts against various known patterns, which may be received from the knowledge database 412 or another computer-readable medium, such as medium 424. In one embodiment, at least a portion of computer-readable medium 424 may house data which an analyst may want to learn about. In one embodiment, new event/table/column/user details may be stored in medium 424. Once learned, these patterns may be added to the respective tables in the respective database, such as knowledge database 412. In certain embodiments, this data may be fed back to one or security applications that monitor and/or detect certain activities (block 316).

In this regard, knowledge database 412 (or other mediums) may comprise information regarding the known application behavior, classification structures for different types of sensitive data. Using one or more processes, novel systems may be configured to indicate (such as for example, by flagging) certain events as either worthy of being escalated or not worthy of being escalated. In one embodiment, the determination is binary—thus either an item is escalated or not escalated. Yet in other embodiments, an item may be scored or assigned a value to indicate the level of escalation. Such values may be used to determine which events should be escalated in view of other events.

If at block 318, if an event is escalated or meets a threshold for escalation, notification(s) may be transmitted. In one embodiment a notification processing module may be utilized. The process may associate the alert with data comprising contact information for escalation and/or peer review as an incident. Output of the reports analysis engine (which may include the one or more rules engines or modules) may be stored in an output report feeds processing engine 436. In certain embodiments, output may not be directly transmitted to a user or a user account but rather may be stored on a computer-readable medium configured such that the information may be accessible through a graphical user interface (GUI). In one embodiment, a GUI may be configured such that only a portion of the information may first be displayed to a user. For example, in one embodiment, summarized data may be available. In certain embodiments, the GUI may provide an option, such as a hyperlink or other user-selectable element that may be imbedded within text and/or graphical representations, to view different information, such as for example, enriched data. The selection may be made through the reception of a user input. This implementation may be useful if, for example, the summarized data suggests anomalous or unauthorized activity has occurred. Further, by allowing the review of summarized data, an analyst may have the option to not consider activity as anomalous or unauthorized if the activity is already known. Other embodiments may allow the reception of a user input selecting an event and, in response, displaying one or more parameters regarding the event. A user input may then navigate through one or more parameters of the event to receive more specific information regarding that parameter or sub-parameter. By providing a GUI in accordance with various embodiments, technicians (or any user) may navigate large quantities of information without having to traverse each entry. The user may quickly determine which activities warrant further review and, in response, quickly and efficiently obtain information regarding the activities without sifting through large amounts of irrelevant data. Because large quantities of data may be collected, the data stored on any computer-readable medium may be overwritten on a routine basis. For example, in one embodiment, the data may be overwritten when new data is received. In one embodiment, the data may be overwritten on a daily basis. Furthermore, one or more mediums may store the processed information in various tables.

Further embodiments relate to a GUI that is configured to provide a way of viewing the data in different views. For example, summarized information may be viewed by groups (i.e. Line of Business), control, and/or exceptions. Yet, in another embodiment, at least a portion of enriched data may be displayed according to user, group, control, exceptions and/or combinations thereof. The GUI may allow a user to escalate an activity (or groups of activities) if necessary by downloading the required records for each case. In certain embodiments, a GUI may be configured to allow a user to view a crossover view of activities/incidents of one or more controls (Example: same user/Client IP address across Extrusion Violation Incidents and Sensitive Objects Incidents).

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A system comprising:
a processor configured to communicate with at least one memory comprising:
   a staging module configured to receive from multiple data feeds, information regarding a plurality of activity events associated with at least one user account from a plurality of user accounts and conducted during a first time period;
   a de-duplication module configured to detect duplicate activity events that exist without technical or human error from the information to create de-duplicated activity events, the de-duplication module comprising:
      a key component configured to detect values within the information to detect at least one of the duplicate activity events;
      a non-key component configured to detect a time value within the information of the plurality of activity events to detect at least one of the duplicate activity events;
      a sum component configured to detect repetitive electronic information among at least two of the plurality of activity events during a time frame within the first time period; and
      an append component configured to append a value onto one or more of the de-duplicated activity events relating to the electronic information of the plurality of activity events;
   an enrichment module configured to enrich the de-duplicated activity events with enrichment criteria from an updatable repository to create enriched activity events; and
   an exclusion module configured to communicate with the enrichment module, and configured to compare known patterns relating to at least one of the user accounts from the plurality of user accounts stored in the repository to the information of the de-duplicated activity events, wherein in combination, the enrichment module and the exclusion module are configured to exclude at least a first portion of the de-duplicated activity events and enrich at least a second portion of the de-duplicated activity events.

2. The system of claim 1, wherein the first time period is between 45 and 50 hours.

3. The system of claim 2, wherein the de-duplication module is configured to remove at least 98% of the plurality of activity events that occurred during the first time period.

4. The system of claim 1, wherein the de-duplication module is configured to generate data comprising comma separated values that represent one of more of the duplicate activity events organized into an aggregate event.

5. The system of claim 1, wherein the enrichment module is configured to apply the enrichment criteria to at least a third portion of the de-duplicated activity events and, based at least in part upon the applied enrichment criteria, the exclusion module is configured to exclude at least one of the de-duplicated activity events of the third portion from further enrichment by the enrichment module.

6. The system of claim 5, wherein the enrichment module is configured to further enrich the first portion of the de-duplicated activity events that were not excluded by the enrichment module.

7. The system of claim 1, wherein at least one of the exclusion module and the enrichment module is configured to receive information regarding user account threshold information.

8. The system of claim 7, wherein the user account threshold information relates to a category selected from the group consisting of: extrusion violations, failed logins, sensitive field access, sensitive object access, escalation of privileges, activity during a first time frame of a first time period, and combinations thereof.

9. The system of claim 8, wherein at least a portion of the threshold information is received from a responsible user account.

10. The system of claim 8, wherein at least a portion of the threshold information is determined, at least in part, from historical data obtained from the a knowledge base.

11. The system of claim 8, wherein the enrichment module is configured to receive information from the knowledge base selected from the group consisting of: a common name of a user associated with a user account, a common name of a network asset, and combinations thereof.

12. The system of claim 8, the at least one memory further comprising:
an actionable identification module configured to determine whether to escalate one of the de-duplicated activity events processed by the enrichment module to a notification.

13. The system of claim 8, wherein the system is configured to determine if a new pattern is detected within the de-duplicated activity events, and if so, the system is further configured to transmit a notification of the new pattern.

14. A non-transitory tangible computer-readable medium comprising computer-executable instructions that when executed by a processor cause a system to perform:
receiving a plurality of data feeds comprising electronic information regarding a plurality of activity events associated with at least one of a plurality of user accounts during a first time period;
detecting and removing duplicate activity events that exist without technical or human error from the electronic information to create de-duplicated activity events, wherein the electronic information of at least one of the duplicate activity events was generated by a first data feed and the electronic information of at least another of the duplicate activity events was generated by a second data feed, wherein the detection of the duplicate activity events is configured to perform at least two actions selected from the group consisting of:
detecting values within the information of the plurality of activity events to detect at least one of the duplicate activity events; and
detecting time values within the information of the plurality of activity events to detect at least one of the duplicate activity events, wherein at least a first portion of the duplicate activity events are removed and a least a second portion of the duplicate activity events are aggregated into an aggregate activity event, wherein the formation of the aggregate activity event comprises:
detecting information indicative of repetitive activity events over a time frame within the first time period; and
appending a value onto one or more of the de-duplicated activity events relating to the information regarding to the repetitive activity events;
enriching the de-duplicated activity events with enrichment criteria to create enriched activity events;
receiving exclusion criteria comprising of at least one of the plurality of user accounts for at least one of the plurality of activity events; and
determining whether to transmit an actionable alert; and
transmitting the actionable alert.

15. The non-transitory computer-readable medium of claim 14, the instructions further comprising:
determining if a new pattern exists within the enriched activity events.

16. The non-transitory computer-readable medium of claim 15, the instructions further comprising:
updating a knowledge base with the new pattern.

17. The non-transitory computer-readable medium of claim 14, wherein at least a portion of the enrichment criteria is received from a first responsible user account and at least a portion of the enrichment criteria is received from a second responsible user account.

18. A system comprising:
a processor configured to communicate with at least one memory comprising a staging module, a de-duplication module, an enrichment module, and an exclusion module, wherein
the staging module is configured to receive electronic information generated from a plurality of data feeds regarding a plurality of activity events for about a 48 hour period regarding a plurality of user accounts;
wherein the electronic information comprises information selected from the group consisting of: extrusion violations, failed logins, sensitive field access, sensitive object access, escalation of privileges;
wherein the de-duplication module is configured to remove duplicate activity events that exist without technical or human error from the electronic information to create de-duplicated activity events, comprising:
a key component configured to detect values within the electronic information of the plurality of activity events to detect one or more of the duplicate activity events;
a non-key component configured to detect time values within the electronic information of the plurality of activity events to detect one or more of the duplicate activity events;
a sum component configured to detect repetitive electronic information among at least two of the plurality of activity events over a time frame within the 48 hour period; and
an append component configured to append a value onto one or more of the de-duplicated activity events relating to the electronic information of the plurality of activity events;
wherein the enrichment module is configured to enrich the de-duplicated activity events with enrichment criteria from an updatable knowledge base to create enriched activity events;
wherein the exclusion module is configured to communicate with the enrichment module, and configured to detect known patterns within the electronic information relating to one or more of the plurality of user accounts, wherein at least a portion of the known patterns are received from the knowledge base, wherein in combination the enrichment module and the exclusion module are configured to exclude at least a first portion of the de-duplicated activity events and enrich at least a second portion of the de-duplicated activity events; and
a mechanism for transmitting an actionable alert comprising information regarding one or more of the enriched activity events.

* * * * *